United States Patent [19]

Clark

[11] E Patent Number: Re. 32,783

[45] Reissued Date of Patent: Nov. 15, 1988

[54] SOLENOID CONSTRUCTION AND METHOD FOR MAKING THE SAME

[75] Inventor: Bruce D. Clark, Clifton Springs, N.Y.

[73] Assignee: G. W. Lisk Company, Inc., Clifton Springs, N.Y.

[21] Appl. No.: 140,660

[22] Filed: Jan. 4, 1988

Related U.S. Patent Documents

Reissue of:

[64] Patent No.: 4,539,542
Issued: Sep. 3, 1985
Appl. No.: 563,891
Filed: Dec. 23, 1983

[51] Int. Cl.[4] ..... H01F 7/08

[52] U.S. Cl. ..... 335/261; 335/262; 335/279

[58] Field of Search ..... 335/251, 255, 257, 258, 335/260, 261, 262, 266, 268, 279

[56] References Cited

U.S. PATENT DOCUMENTS

| | | | |
|---|---|---|---|
| 2,735,047 | 2/1956 | Garner et al. | 335/262 X |
| 3,241,006 | 3/1966 | Boyko | 335/279 X |
| 3,381,250 | 4/1968 | Weathers | 335/255 |
| 3,460,081 | 8/1969 | Tillman | 335/268 X |
| 3,510,814 | 5/1970 | Nordfors | 335/262 |
| 3,633,139 | 1/1972 | Thompson | 335/255 |
| 3,735,302 | 5/1973 | Eckert | 335/262 |
| 3,870,931 | 3/1975 | Myers | 335/268 X |
| 3,900,822 | 8/1975 | Hardwick et al. | 335/268 |
| 3,970,981 | 7/1976 | Coors | 335/266 |
| 4,044,324 | 8/1977 | Coors | 335/260 |
| 4,166,991 | 9/1979 | Haner | 335/261 |
| 4,218,669 | 8/1980 | Hitchcock et al. | 335/258 |
| 4,239,401 | 12/1980 | Veale | 335/262 X |
| 4,278,959 | 7/1981 | Nishimiya et al. | 335/262 |
| 4,282,501 | 8/1981 | Myers | 335/258 |
| 4,339,109 | 7/1982 | Kawata et al. | 335/258 |

FOREIGN PATENT DOCUMENTS

| | | | |
|---|---|---|---|
| 67905 | 11/1948 | Denmark | 335/261 |
| 847465 | 7/1949 | Fed. Rep. of Germany | 335/261 |
| 1270178 | 6/1968 | Fed. Rep. of Germany | 335/261 |

OTHER PUBLICATIONS

"Cove Tube & Parts", No. 819, 714, 7/82, Vickers, Inc., Troy, Michigan.

*Primary Examiner*—George Harris
*Attorney, Agent, or Firm*—Stonebraker, Shepard & Stephens

[57] ABSTRACT

A proportional solenoid consisting of a stationary pole piece of ferromagnetic material which has a radially externally facing frusto-conical section surrounding a cylindrical recess in the stationary pole piece. Both the stationary pole piece and armature are fitted into the bore of a guide tube. Thus, the bore of the guide tube provides the required concentricity between the movable armature and the stationary pole piece. The movable armature is provided with an integral reduced diameter cylindrical nose that is complimentary to the cylindrical recess of the stationary pole piece.

29 Claims, 1 Drawing Sheet

SOLENOID CONSTRUCTION AND METHOD FOR MAKING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to solenoids and methods for making the same and particularly proportional type solenoids.

2. Description of the Prior Art

General purpose solenoids provide a force-stroke curve whereby the force at closed stroke gap is higher than the force developed at the initial starting stroke gap. These solenoids are sometimes referred to as "on-off" solenoids and are energized ("on") to a fully operated position or are de-energized ("off") to a fully neutral position. In this type of solenoid, in order to activate the armature to close the stroke gap, the solenoid must only provide enough force to overcome the load including any frictional or sideloading magnetic forces perpendicular to the axis of motion.

Proportional solenoids have long been known in the art to provide a force vs. stroke curve that allows the output force of the solenoid to be proportional to the electrical current applied to the coil. This proportionality of the output force permits such a solenoid to either fully or partially operate a load by selectively applying either the full or a partial electrical current to the solenoid coil and thereby may selectively position the armature along the linear distance of the gap.

In order to operate this type of solenoid accurately, the forces in the solenoid must be accurately controlled. Since the frictional and side-loading forces vary depending upon a number of factors, including tolerances in manufacturing and the equipment being operated by the solenoid and cannot be accurately controlled, desirably their effects should be minimized in the design of the solenoid.

The prior art history of proportional solenoids and problems of such solenoids is described in U.S. Pat. No. 3,900,822, Column 1 (Hardwick).

The prior art proportional solenoid provided multiple complex bearing surfaces including a bearing between the armature rod and the stationary pole piece. For example, see the complex bearing and structural support for the armature in each of the prior art patents, German Pat. No. 1,270,178, and U.S. Pat. Nos. 3,870,931 and 3,970,981, in order to provide the necessary structure for a proportional solenoid and to provide concentricity of the armature. Such constructions required very fine manufacturing tolerances and it was difficult assembling such solenoids.

In order to overcome the concentricity problems of the above prior art patents and provide a concentricity tube for maintaining concentricity of both the armature and fixed pole piece, a multiple section armature tube 10 as shown in FIG. 1 of the drawings was invented which multiple section tube 10 included a magnetic section 12 made of ferromagnetic material having an external frusto-conical surface 14. The next section of the tube is a non-magnetic brass ring 16 brazed or otherwise permanently fixed at the surface 14 to section 12 and is brazed or permanently fixed along an opposite frusto-conical surface 18 to a third section 20 made of ferromagnetic material. Thus, the non-magnetic brass ring middle section 16 provides the essential non-magnetic radial transverse frusto-conical gap, which gap is linearly coextensive with the stroke-gap of the armature. The tube 10 is press fitted or otherwise permanently fixed to a stationary or fixed magnetic pole piece 22 made of ferromagnetic material. The composite armature tube 10 and stationary pole piece 22 are received and mounted in a solenoid coil (not shown).

A moveable armature 24 made of ferromagnetic material is provided with a pair of spaced non-magnetic bearing surfaces 26 made by bronze bushings for example. There is a non-magnetic shim 28 surrounding a push rod 30 permanently mounted on armature 24 and slidable in a center hole 32 of the stationary pole piece 22.

The construction of the three section tube shown in FIG. 1 is similar to the construction shown in U.S. Pat. No. 3,970,981 except that all three sections are brazed or otherwise fixed together to form one continuous multiple section multiple metal armature tube.

SUMMARY OF THE PRESENT INVENTION

The present invention includes a hollow solenoid armature tube adapted to be received in a solenoid coil, a stationary pole piece member fixed in one end of the tube, an armature member adapted for axial sliding movement in the tube, one of the members having an axially extending recess therein and the other of the members having a reduced in cross-section end portion adapted to be received in and complimentary to said recess, the member having the recess also having a radially externally facing frusto-conical surface surrounding the recess, the tube thereby providing concentricity of the two members, and the tube having a non-magnetic section extending coaxially with the gap made by the stroke of the armature.

The present invention minimizes the concentricity problems with proportional type solenoids with a less complicated structure than prior art solenoids. This is done by containing both the stationary pole piece and the movable armature within the same cylindrical surface of a single metal armature guide tube.

The present invention pertains to proportional type solenoids. It is an object of this invention to provide an improved solenoid construction overcoming the problems of the prior art as described above.

It is an important object of this invention to reduce the effects of magnetic side loading with simpler structure than the prior art. This is done by controlling the concentricity between a reduced diameter cylindrical nose of the movable armature and the mating cylindrical recess in a stationary pole piece. Concentricity is maintained because both the movable armature and the stationary pole piece are confined by the bore of a one piece metal guide tube.

It is further an object of this invention to minimize magnetic side loading by providing a non-magnetic space between most of the linear dimensions of the armature and the adjacent magnetic members, which can be provided by at least several alternatives such as a uniform non-magnetic bearing surface or simply making the entire guide tube non-magnetic.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE ILLUSTRATED PREFERRED EMBODIMENT

Figure 2:
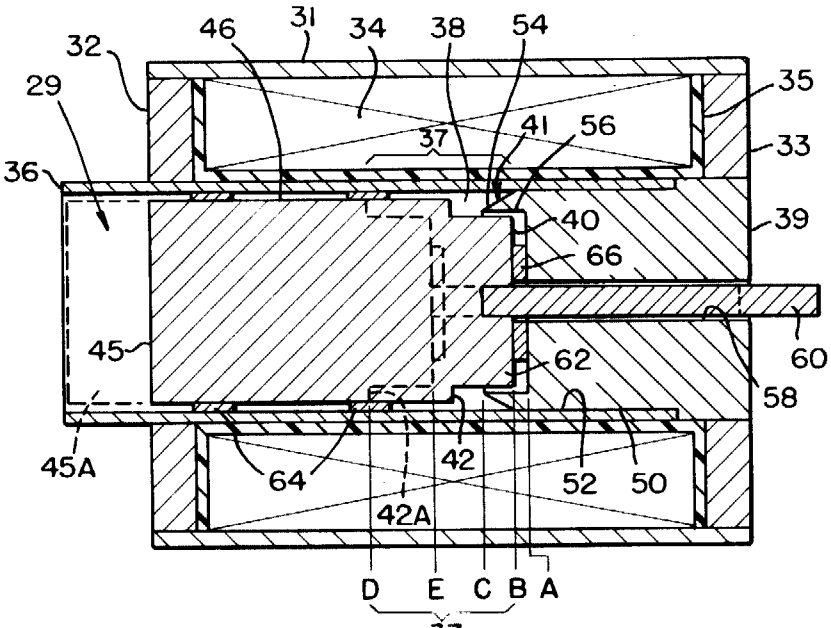
FIG. 2 is a cross-sectional view of one embodiment of the present invention with a solenoid coil and housing added.

The preferred embodiment, illustrated in FIG. 2, of the invention is a general purpose proportional solenoid. The construction of the present invention is readily adaptable to proportional solenoids requiring a pressure tight bore such as those solenoids used in hydraulic applications. Also, this invention is readily adaptable to push-pull solenoids. The illustrated embodiment includes an outer housing 31 made of ferromagnetic material. An end washer 32 and an end washer 33 made of ferromagnetic material are press fitted into the housing 31. The housing 31 and end washers 32 and 33 encase an electrical winding or coil 34 that is wound on a coil form (bobbin) 35.

A concentricity guide tube or hollow solenoid armature tube 36 is preferably a one-piece metal tube made of magnetic stainless steel material, defining a cylindrical armature chamber 29 adapted to receive an armature 45 made of ferromagnetic material. The armature 45 is adapted to slide axially in the armature chamber 29. The armature tube 36 has a cylindrical non-magnetic middle section 37 (described more in detail hereinafter).

In the FIG. 2 embodiment, the armature tube 36 is preferably made of semiaustenitic steel (as described more in U.S. Pat. No. 3,633,139), such as that known as 17-7P.H. (precipitation hardening) stainless steel. The non-magnetic (austenitic) section 37 provides hinderance to that portion of the magnetic field trying to pass through the non-magnetic section 37 of the armature tube 36, thereby providing a gap which is reduced in magnetic force described more in detail hereinafter. The remainder of the armature tube 36 on both sides of the non-magnetic section 37 are magnetic (martensitic) in order to minimize hinderance of the magnetic field passing radially therethrough. Or, the armature tube 36 may be entirely non-magnetic, when the armature tube wall thickness is thin enough to keep the magnetic losses sufficiently small to allow the solenoid to operate with the desired efficiency.

Although from a manufacturing point of view it would be more expensive and therefore less desirable, it would be possible within the concept of this invention to provide a welded or brazed together multiple section tube having at least one non-magnetic section extending axially along the desired gap which is reduced in magnetic force, in lieu of the one piece tube 36, and still fulfill the concept and functions of this invention.

There is a stationary pole piece 39 fixed in one end of the armature tube 36 thereby defining one end of the armature chamber 29. Stationary pole piece 39 has a radially externally facing frusto-conical section 41 having a radially externally facing frusto-conical surface 54 that is annular and concentric to the center axis of the tube and that surrounds an axial cylindrical concentric recess 56 (that is also concentric to the tube axis) of the stationary pole piece 39. Stationary pole piece 39 has a center bore 58 adapted to receive a non-magnetic push rod 60 permanently mounted on the armature 45. The stationary pole piece 39 is made of ferromagnetic material and has a linear section with a reduced outside diameter 50 which is press fitted into a bore 52 of the armature tube 36.

Thus, both the stationary pole piece 39 and the movable armature 45 are maintained in concentricity by the armature tube 36.

The armature 45 is shown in FIG. 2 in solid line in its energized position, and is shown in FIG. 2 in broken line at 45A in its de-energized or "neutral" position.

The non-magnetic section 37 of the armature tube 36 surrounds an air gap 38. The armature 45 has a center reduced in cross-section axial cylindrical concentric end portion or nose 62 defining a shoulder 42. The reduced in cross-section portion 62 is received in and complimentary to the cylindrical recess 56 of the stationary pole piece 39. The shoulder 42 of movable armature 45 (as illustrated in the retracted position at 42A and as shown in broken-line on the armature in the retracted broken-line position 45A) defines the air gap 38 which extends axially to the radially externally facing frusto-conical section 41 of the stationary pole piece 39.

The non-magnetic section 37 and air gap 38 in the FIG. 2 illustrated embodiment each extend coaxially from an internal radial end surface 40 of armature 45 represented by the line B (of FIG. 2) to the line D (of FIG. 2) (which is the shoulder 42A when the armature 45 is in its de-energized broken-line position). In this embodiment, the non-magnetic section 37 and air gap 38 exceed the full stroke of the armature illustrated in FIG. 2 which full stroke is between the lines B and E, and includes a "working stroke" between the lines B to C of FIG. 2, and an "overtravel" stroke between the lines C and E of FIG. 2. The force characteristics of each of these strokes are described hereinafter with reference to FIG. 4 which illustrates these force characteristics.

Figure 4:
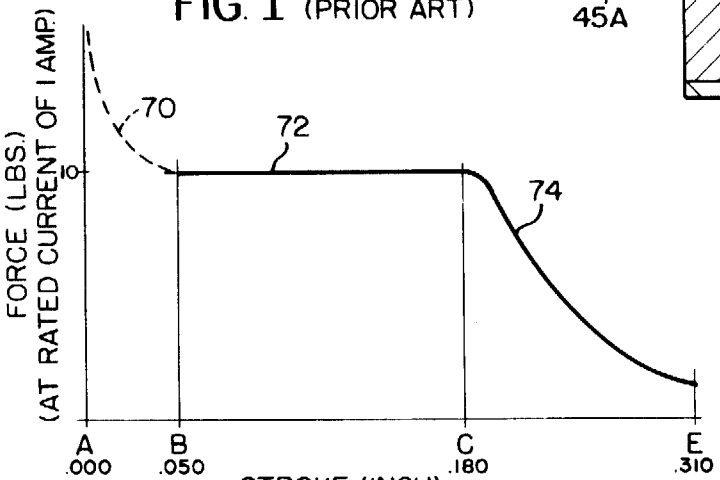
FIG. 4 is a graph showing the force-stroke performance of the solenoid provided by the present invention.

Thus, the non-magnetic section 37 of the tube provides a gap which is reduced in magnetic force, shown in FIG. 2 between the lines B to D (hereinafter referred to as reduced magnetic gap) illustrated so that in the present embodiment the reduced magnetic gap is coaxially the same as the air gap 38, thereby also extending between the lines B and D of FIG. 2; thus, is provided a reduced magnetic gap coaxially longer than the full stroke of the armature which extends only between the lines B and E of FIG. 2. It will be understood by one skilled in the art that the coaxial distance of the non-magnetic section 37 can be selectively varied in order to permit the desired selected magnetic forces to be produced on the armature 45 in order to get the resulting desired selected proportional forces output and forces curve. One such desired curve is shown in FIG. 4, other curves can be obtained as desired. As already described, the armature tube 36 may be constructed of completely non-magnetic material such as non-magnetic stainless steel. What is important is that the non-magnetic section 37 of the armature tube 36 extends coaxially at least a selected portion of the armature stroke sufficient to permit selected magnetic forces to be produced on the armature 45 to get the desired selected proportional forces output and curve.

An external cylindrical surface 46 of the armature 45 is provided with a pair of cylindrical spaced uniform non-magnetic bearing surfaces 64 made by electroless nickel plating. Thus, a uniform non-magnetic space is provided between the armature 45 and the armature tube 36, which minimizes the effects of frictional and sideloading forces. A non-magnetic brass shim 66 is provided to eliminate the portion of the stroke which yields undesirable rising force characteristics as illustrated by that portion of the curve on the FIG. 4 graph between the lines A to B.

The graph illustrated in FIG. 4 shows a typical force vs. stroke curve for the FIG. 2 solenoid which has a 20 ohm coil with a size of 1.75 inch outside diameter, 2 inch long and an 0.88 inch diameter bore. The forces shown by the solid line 74 between the lines E and C (FIG. 4) is termed "overtravel" stroke and is used when additional stroke gap is required beyond the "working" stroke gap C-B. The additional stroke gap may be required for some other use, for example on a double solenoid hydraulic valve. The force shown by solid line 72 between the lines C and B of FIG. 4 shows a substantially constant force characteristic which illustrates the force during the solenoid "working" stroke as the armature 45 moves from the partially energized "C" position of FIG. 2 toward the fully energized (solid line) "B" position of FIG. 2. The broken-line force, shown by the curve or line 70 between lines B and A (FIG. 4) is generally undesirable and is eliminated as described above by inserting the shim 66.

Figure 3:
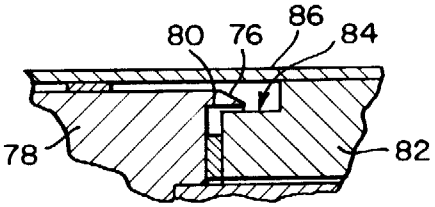
FIG. 3 is a cross-sectional view of a portion of a second embodiment of the present invention.
Figure 1:
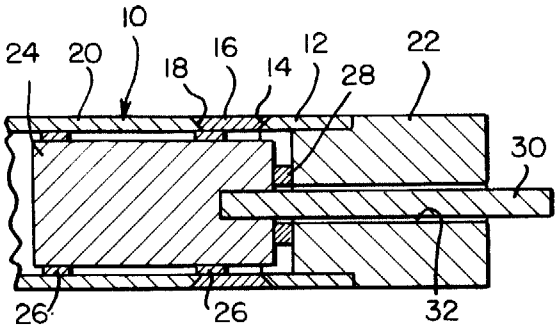
FIG. 1 (PRIOR ART)
FIG. 1 is a cross-sectional view of a prior art solenoid tube and pole pieces.

FIG. 3 illustrates a portion of a second embodiment of this invention in which the relative positions of the radially externally facing frusto-conical surface 54 (FIG. 2) and recess 56 (FIG. 2) of the stationary pole piece 39 are reversed. Thus, a radially externally facing frusto-conical surface 76 is provided on armature 78 of FIG. 3 and likewise there is a corresponding reversal of the parts by incorporating a reduced in cross-section cylindrical end portion or nose 84 corresponding to the nose piece 62 of FIG. 2 on a stationary pole piece 82 of FIG. 3. The radially externally facing frusto-conical surface 76 surrounds an axial cylindrical concentric recess 80 corresponding to the recess 56 of the stationary pole piece 39 in FIG. 2. The armature 78 and the stationary pole piece 82 are maintained in concentricity by an armature tube 86. The rest of the structure of the FIG. 3 embodiment is the same as in the FIG. 2 embodiment.

The invention has been described in detail above with particular reference to preferred embodiments thereof, but it will be understood that variations and modifications can be effected within the spirit and scope of the invention as described hereinabove and as defined in the appended claims.

I claim:

1. An assembly for use in a solenoid comprising:

(a) a hollow solenoid armature tube adapted to be received in a solenoid coil, said tube having an armature chamber therein;

(b) a stationary pole piece member fixed in and defining one end of said armature chamber;

(c) an armature member positioned in said armature chamber of said tube for axial sliding movement relative to and defining an armature stroke relative to said pole piece member;

(d) one of said members having an axially extending recess therein and the other member having a reduced in cross-section end portion adapted to be received in and complimentary to said recess;

(e) said one member having a [radially externally facing] frusto-conical surface surrounding said recess and *facing radially externally into an air gap in said chamber, said air gap* extending [into said chamber] *from said frusto-conical surface to said armature tube in a region of said chamber not entered by said other member;*

(f) said armature tube having a non-magnetic section defining a reduced magnetic gap extending coaxially with *said air gap and with* at least a portion of said armature stroke sufficient to permit selected magnetic forces to be produced on said armature; and (g) said armature tube providing concentricity of said two members.

2. An assembly in accordance with claim 1 in which said armature tube comprises a one-piece metal tube.

3. An assembly in accordance with claim 1 including non-magnetic bearing means between said armature member and said armature tube for reducing friction.

4. An assembly in accordance with claim 3 in which said bearing means provides a non-magnetic space between said armature member and said armature tube.

5. An assembly in accordance with claim 4 in which said bearing means comprises multiple circumferential bearing surfaces spaced linearly along said armature.

6. An assembly in accordance with claim 1 in which said stationary pole piece member has a reduced in cross-section part adapted to be received in and mate with the internal surface of one end of said armature tube.

7. An assembly in accordance with claim 1 in which said armature tube comprises a one-piece semi-austenitic material tube treated to be non-magnetic along said non-magnetic section of said tube.

8. An assembly in accordance with claim 1 in which said armature tube comprises a non-magnetic one-piece tube.

9. An assembly in accordance with claim 1 in which said armature tube comprises a non-magnetic metal one-piece tube.

10. An assembly for use in a solenoid comprising:

(a) a hollow solenoid armature tube adapted to be received in a solenoid coil, said tube having an armature chamber therein;

(b) a stationary pole piece member fixed in and defining one end of said armature chamber;

(c) an armature member positioned in said armature chamber of said tube for axial sliding movement relative to and defining an armature stroke relative to said pole piece member;

(d) one of said members having an axially extending recess therein and the other member having a reduced in cross-section end portion adapted to be received in and complimentary to said recess;

(e) said one member having a [radially externally facing] frusto-conical surface surrounding said recess and *facing radially externally into an air gap in said chamber, said air gap* extending [into said chamber] *from said frusto-conical surface to said armature tube in a region of said chamber not entered by said other member;*

(f) said armature tube having a non-magnetic section means providing a reduced magnetic gap extending coaxially with *said air gap and with* at least a portion of said armature stroke sufficient to permit selected magnetic forces to be produced on said armature; and (g) said armature tube providing concentricity of said two members.

11. An assembly in accordance with claim 10 in which said armature tube comprises a one-piece metal tube.

12. An assembly in accordance with claim 10 in which said stationary pole piece member has a reduced in cross-section part adapted to be received in and mate with the internal surface of one end of said armature tube.

13. An assembly in accordance with claim 10 in which said armature tube comprises a one-piece semi-austenitic material tube treated to be non-magnetic along said non-magnetic section of said tube.

14. An assembly in accordance with claim 10 in which said armature tube comprises a non-magnetic metal one-piece tube.

15. An assembly for use in a solenoid comprising:

(a) a one-piece cylindrical metal hollow solenoid armature tube adapted to be received in a solenoid coil, said tube having a cylindrical armature chamber therein;

(b) a stationary pole piece member fixed in and defining one end of said armature chamber;

(c) a cylindrical armature member positioned in said armature chamber of said tube for axial sliding movement defining a stroke gap relative to and defining an armature stroke relative to said pole member;

(d) one of said members having an axial concentric cylindrical recess therein and the other cylindrical member having a reduced in cross-section axial cylindrical concentric end portion adapted to be received in and complimentary to said recess;

(e) said one member having [a radially externally facing] *an* annular concentric frusto-conical surface surrounding said recess and *facing radially externally into an air gap in said chamber, said air gap* extending [into said chamber] *from said frusto-conical surface to said armature tube in a region of said chamber not entered by said other member;*

(f) said armature tube having a non-magnetic section means providing a reduced magnetic gap extending coaxially with *said air gap and with* at least a portion of said armature stroke sufficient to permit selected magnetic forces to be produced on said armature; and (g) said armature tube providing concentricity of said two members.

16. An assembly in accordance with claim 15 including non-magnetic bearing means between said armature member and said armature tube for reducing friction.

17. An assembly in accordance with claim 16 in which said bearing means provides a non-magnetic space between said armature member and said armature tube.

18. An assembly in accordance with claim 17 in which said bearing means comprises surfaces spaced linearly along said armature.

19. An assembly in accordance with claim 15 in which said stationary pole piece member has a reduced in cross-section part adapted to be received in and mate with the internal surface of one end of said armature tube.

20. An assembly in accordance with claim 15 in which said armature tube comprises a one-piece [sem-austenitic] *semi-austenitic* material tube treated to be non-magnetic along said non-magnetic section of said tube.

21. An assembly in accordance with claim 15 including a solenoid coil surrounding said armature tube.

22. A method of providing an assembly for use in a solenoid comprising the steps of:

(a) providing a hollow solenoid armature tube adapted to be received in a solenoid coil, said tube having an armature chamber therein;

(b) providing a stationary pole piece member fixed in and defining one end of said armature chamber;

(c) providing an armature member positioned in said armature chamber of said tube for axial sliding movement relative to and defining an armature stroke relative to said pole piece member;

(d) providing one of said members with a reces therein and the other member with a reduced in cross-section end portion adapted to be received in and complimentary to said recess;

(e) providing said one member with [an externally facing] *a* frusto-conical surface surrounding said recess and *facing radially externally into an air gap in said chamber, said air gap* extending [into said chamber] *from said frusto-conical surface to said armature tube in a region of said chamber not entered by said other member;*

(f) providing said armature tube with a non-magnetic section [definiug] *means providing* a reduced magnetic gap extending coaxially with *said air gap and with* at least a portion of said armature stroke sufficient to permit selected magnetic forces to be produced on said armature; and (g) said armature tube providing concentricity of said two members.

23. A method in accordance with claim 22 in which said armature tube is provided as a one-piece metal tube.

24. A method in accordance with claim 22 including the step of providing a non-magnetic bearing means between said armature member and said armature tube for reducing friction.

25. A method in accordance with claim 24 in which said bearing means is provided as a non-magnetic space between said armature member and said armature tube.

26. A method in accordance with claim 22 in which said bearing means is provided as multiple circumferential bearing surfaces spaced linearly along said armature.

27. A method in accordance with claim 22 in which said stationary pole piece member is provided with a reduced in cross-section part adapted to be received in and mate with the internal surface of one end of said armature tube.

28. A method in accordance with claim 22 in which said armature tube is provided as a one-piece semi-austenitic material tube treated to be non-magnetic along said non-magnetic section of said tube.

29. A method in accordance with claim 22 including providing a solenoid coil surrounding said armature tube.

* * * * *